United States Patent
Zhai et al.

(10) Patent No.: US 12,381,967 B2
(45) Date of Patent: Aug. 5, 2025

(54) TRANSMISSION LINE ASSEMBLY, ANTENNA ASSEMBLY, AND MOBILE TERMINAL

(71) Applicant: HUAWEI TECHNOLOGIES CO., LTD., Guangdong (CN)

(72) Inventors: Guojian Zhai, Shenzhen (CN); Jian Luo, Shenzhen (CN); Lifen Bao, Shenzhen (CN); Pixian Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 18/250,743

(22) PCT Filed: Sep. 8, 2021

(86) PCT No.: PCT/CN2021/117292
§ 371 (c)(1),
(2) Date: Apr. 26, 2023

(87) PCT Pub. No.: WO2022/089026
PCT Pub. Date: May 5, 2022

(65) Prior Publication Data
US 2023/0396699 A1  Dec. 7, 2023

(30) Foreign Application Priority Data
Oct. 27, 2020 (CN) .......................... 202022428861.3
Aug. 17, 2021 (CN) .......................... 202110943245.8

(51) Int. Cl.
*H04M 1/02* (2006.01)
*H01Q 1/22* (2006.01)
*H01Q 1/50* (2006.01)

(52) U.S. Cl.
CPC .............. *H04M 1/026* (2013.01); *H01Q 1/22* (2013.01); *H01Q 1/50* (2013.01)

(58) Field of Classification Search
CPC ........... H04M 1/026; H01Q 1/22; H01Q 1/50; H01Q 1/52; H01Q 13/08; H01Q 1/48; H01Q 5/20; H04B 1/0458; H04B 1/0475; H04B 3/26
See application file for complete search history.

(56) References Cited

U.S. PATENT DOCUMENTS

| | | | |
|---|---|---|---|
| 10,686,482 B2 * | 6/2020 | Michaeli | H01Q 13/10 |
| 10,879,590 B2 * | 12/2020 | Li | H01Q 1/48 |
| 2006/0114079 A1 * | 6/2006 | Cantrell | H01P 9/00 333/160 |
| 2019/0260113 A1 * | 8/2019 | Wang | H01Q 1/38 |

FOREIGN PATENT DOCUMENTS

| | | |
|---|---|---|
| CN | 101065878 A | 10/2007 |
| CN | 104519952 A | 4/2015 |
| EP | 3258539 A1 | 12/2017 |

* cited by examiner

Primary Examiner — Seung H Lee

(57) ABSTRACT

A transmission line assembly includes a transmission line and a first filter. The transmission line is configured to transmit a radio frequency signal, and the transmission line has a first end and a second end. The transmission line includes an inner conductor and an outer conductor. The first filter is connected to one end of the outer conductor of the transmission line. The first end of the outer conductor is grounded through the filter.

20 Claims, 9 Drawing Sheets

TRANSMISSION LINE ASSEMBLY, ANTENNA ASSEMBLY, AND MOBILE TERMINAL

CROSS-REFERENCE TO RELATED APPLICATIONS

This application is a National Stage of International Application No. PCT/CN2021/117292 filed on Sep. 8, 2021, which claims priority to Chinese Patent Application No. 202110943245.8 filed on Aug. 17, 2021 and Chinese Patent Application No. 202022428861.3 filed on Oct. 27, 2020, the disclosures of which are hereby incorporated by reference in their entireties.

TECHNICAL FIELD

This application relates to the field of communication technologies, and in particular to a transmission line assembly, an antenna assembly, and a mobile terminal.

BACKGROUND

Transmission lines are widely used in mobile terminal devices such as mobile phones and tablet computers. As a signal transmission medium, the transmission line is mainly configured to transfer radio frequency signals between circuit boards, or transfer radio frequency signals between a circuit board and an antenna.

In actual application, because a length of the transmission line is close to a radio frequency operating wavelength, if the transmission line is disposed near an antenna, it is likely to generate a series of clutters in a band of the antenna in a use process. Due to the clutters, radiation efficiency and signal transmission quality of the antenna are reduced, and quality consistency of a mobile terminal device is further affected. Therefore, how to reduce or avoid an impact of the clutters in the transmission line on the antenna becomes an urgent technical problem to be resolved.

SUMMARY

This application provides a transmission line assembly, an antenna assembly, and a mobile terminal, to resolve a clutter problem.

According to an aspect, this application provides a transmission line assembly, including a transmission line and a first filter. The transmission line is configured to transmit a radio frequency signal, and the transmission line has a first end and a second end. The transmission line includes an inner conductor and an outer conductor. The first filter is connected to one end of the outer conductor of the transmission line. The first end of the outer conductor is grounded through the filter.

During specific implementation, the transmission line may be a coaxial transmission line, a microstrip transmission line, a liquid crystal polymer transmission line, a modified polyimide transmission line, or the like.

The coaxial transmission line and the microstrip transmission line are used as examples.

The microstrip transmission line is a microwave transmission line formed by a single conductor supported on a dielectric substrate. A grounding metal plate is manufactured at the other surface of the substrate. The microstrip transmission line is suitable for manufacturing a planar transmission line of a microwave integrated circuit. The microstrip transmission line has advantages such as a small volume, a light weight, a wide usage frequency band, high reliability, and low manufacturing costs. The microstrip transmission line may be disposed on a printed circuit board (Printed Circuit Board, PCB), or may be disposed on a flexible printed circuit (Flexible Printed Circuit, FPC). This is not limited herein.

The coaxial transmission line is a shielded and non-dispersive structure. A dominant mode of a waveguide in the coaxial transmission line is a TEM mode, while transmission in a TE mode and a TM mode may also be supported. A cut-off frequency of the coaxial transmission line is zero, and a corresponding cut-off wavelength tends to be infinite. The coaxial transmission line is a dual-conductor transmission line including an inner conductor, an outer conductor, and a dielectric therebetween, where the inner conductor and the outer conductor are coaxial. The outer conductor of the coaxial transmission line is grounded. An electromagnetic field is limited between the inner conductor and the outer conductor.

In addition, during specific implementation, a type of the filter, a quantity of filters, and a connection relationship between the filter and the outer conductor of the transmission line may also be diversified.

For example, the first end of the outer conductor of the transmission line may be grounded through a first band-stop filter, and a second end of the outer conductor of the transmission line may be grounded through a second band-stop filter.

Alternatively, the first end of the outer conductor of the transmission line is directly grounded, and a second end of the outer conductor of the transmission line may be grounded through a band-pass filter. The band-pass filter may be a high-pass filter. To be specific, the filter includes a capacitor, and the second end of the outer conductor of the transmission line is grounded through the capacitor. Alternatively, the band-pass filter may be a low-pass filter. To be specific, the filter includes an inductor, and the second end of the outer conductor of the transmission line is grounded through the inductor.

Alternatively, the first end of the outer conductor of the transmission line is grounded through a first band-pass filter, and a second end of the outer conductor of the transmission line may be grounded through a second band-pass filter. The first band-pass filter may be a high-pass filter, and the second band-pass filter may be a high-pass filter. To be specific, the first band-pass filter includes a capacitor, and the first end of the outer conductor of the transmission line is grounded through the capacitor. The second band-pass filter includes a capacitor, and the second end of the outer conductor of the transmission line is grounded through the capacitor.

The first band-pass filter may be a low-pass filter, and the second band-pass filter may be a low-pass filter. To be specific, the first band-pass filter includes an inductor, and the first end of the outer conductor of the transmission line is grounded through the inductor. The second band-pass filter includes an inductor, and the second end of the outer conductor of the transmission line is grounded through the inductor.

It may be understood that, in specific application, the first filter and the second filter may be of a same type or different types. This is not specifically limited herein.

In addition, an embodiment of this application further provides an antenna assembly, including an antenna and a cable assembly. In the antenna assembly provided in this application, a transmission line is grounded through a filter, thereby tuning a clutter outside an operating frequency band of the transmission line and reducing or avoiding an impact of the clutter on efficiency of an antenna near the transmission line.

During specific implementation, a quantity of disposed antennas and a disposing location may be adaptively selected and adjusted according to different requirements. This is not limited in this application.

For example, the antenna assembly may include a first antenna, a second antenna, a first transmission line, and a second transmission line. The first transmission line is configured to transmit a radio frequency signal to the first antenna, and the second transmission line is configured to transmit a radio frequency signal to the second antenna.

During specific implementation, an operating frequency band of the first antenna may be different from an operating frequency band of the second antenna. For example, the first antenna may be an antenna configured to generate a low-frequency signal, and the second antenna may be an antenna configured to generate a medium-high-frequency signal.

It may be understood that, in another implementation, the antenna assembly may include more antennas and transmission lines. This is not specifically limited in this application.

In addition, an embodiment of this application further provides a mobile terminal, including the foregoing antenna assembly. In the mobile terminal provided in this application, the foregoing antenna assembly is disposed, to ensure radiation efficiency and signal transmission quality of an antenna, thereby improving quality consistency and use effect of the mobile terminal device.

In actual application, the mobile terminal may be a mobile phone, a tablet computer, or the like. This is not limited in this application.

DESCRIPTION OF EMBODIMENTS

To make objectives, technical solutions, and advantages of this application clearer, the following further describes this application in detail with reference to the accompanying drawings and specific embodiments.

Terms used in the following embodiments are merely intended to describe specific embodiments, but are not intended to limit this application. Terms "one", "a", "the foregoing", "the", and "the one" of singular forms used in this specification and the appended claims of this application are also intended to include plural forms like "one or more", unless otherwise specified in the context clearly. It should be further understood that in the following embodiments of this application, "at least one" and "one or more" mean one, two, or more. The term "and/or" is used to describe an association relationship between associated objects and represents that three relationships may exist. For example, A and/or B may indicate the following cases: Only A exists, both A and B exist, and only B exists, where A and B each may be singular or plural. The character "/" generally indicates an "or" relationship between associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

Figure 1:
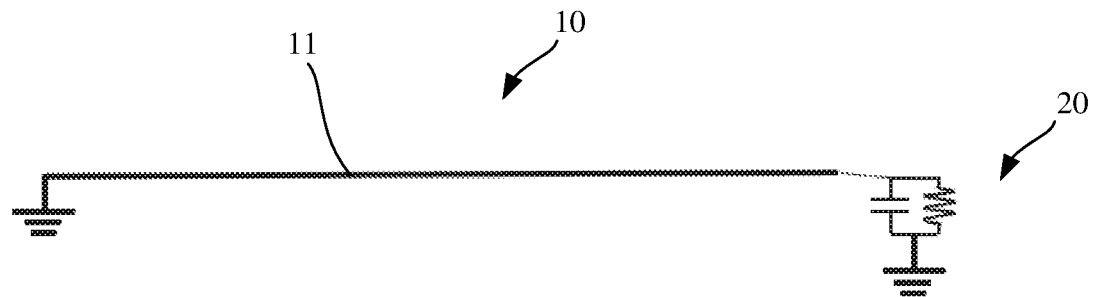
FIG. 1 is a schematic diagram of a connection structure of a transmission line assembly according to an embodiment of this application.

As shown in FIG. 1, in an embodiment provided in this application, a transmission line assembly includes a transmission line 10 and a filter 20. The transmission line 10 is configured to transmit a radio frequency signal, and the transmission line 10 has a first end (a right end in the figure) and a second end (a left end in the figure). The transmission line includes an inner conductor (not shown in the figure) and an outer conductor 11. The filter 20 is connected to a right end of the outer conductor 11 of the transmission line 10. The right end of the outer conductor 11 is grounded through the filter 20. A left end of the outer conductor 11 is directly grounded.

Figure 4:
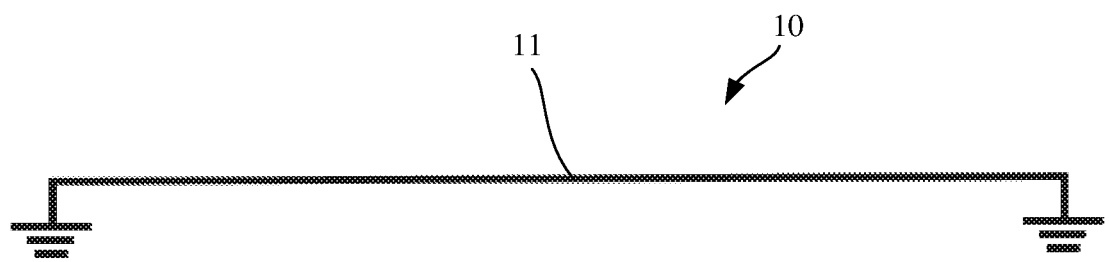
FIG. 4 is a schematic diagram of a connection structure of another transmission line assembly according to an embodiment of this application.

In actual application, as shown in FIG. 4, generally, grounding needs to be performed on two ends of the outer conductor 11 of the transmission line 10. In this case, a loop structure is formed between the outer conductor of the transmission line 10 and the ground, thereby generating clutters. The clutters are generated by a loop formed between the outer conductor 11 of the transmission line 10 and the ground. Therefore, in the transmission line assembly provided in this application, the filter 20 is added between the outer conductor 11 and the ground, to ensure that the transmission line 10 can relocate the clutters while being grounded within an operating frequency range, thereby avoiding or reducing an adverse impact caused by the clutters.

As a frequency selection apparatus, the filter 20 can be used to ensure that some signal frequencies (for example, required signal frequencies) in the outer conductor 11 of the transmission line 10 may be grounded, and some signal frequencies (for example, signal frequencies that are not required) float. The filter 20 may be a filter circuit including a capacitor, an inductor, and a resistor. In this case, a signal frequency that is not required in the transmission line 10 may float with high resistance, and a required signal frequency may be grounded. The filter 20 is classified into a low-pass filter, a high-pass filter, and a band-stop filter based on a frequency band of a signal that passes through the filter 20. The low-pass filter means a filter that passes low-frequency or direct-current components of a signal and suppresses high-frequency components, high-frequency interference, or high-frequency noise. The high-pass filter means a filter that passes high-frequency components of a signal and suppresses low-frequency or direct-current components. A band-pass filter means a filter that passes signals in a specific frequency band and suppresses signals, interference, or noise at a lower or higher frequency outside the frequency band. The band-stop filter means a filter that suppresses signals in a specific frequency band and passes signals outside the frequency band.

During specific implementation, the transmission line 10 may be a coaxial transmission line, a microstrip transmission line, a liquid crystal polymer transmission line, a modified polyimide transmission line, or the like.

Figure 2:
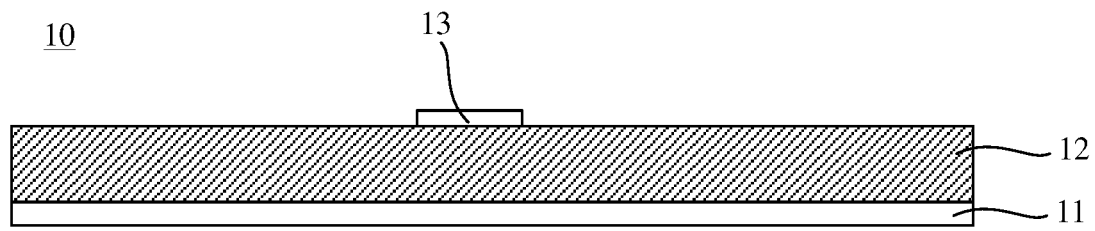
FIG. 2 is a schematic diagram of a sectional structure of a microstrip transmission line according to an embodiment of this application.

As shown in FIG. 2, the microstrip transmission line 10 is a microwave transmission line 10 formed by a single conductor 13 disposed on a dielectric substrate 12. A grounding metal plate 11 is manufactured at the other surface of the substrate 12. The microstrip transmission line 10 is suitable for manufacturing a planar transmission line 10 of a microwave integrated circuit. The microstrip transmission line 10 has advantages such as a small volume, a light weight, a wide usage frequency band, high reliability, and low manufacturing costs. The microstrip transmission line 10 may be disposed on a printed circuit board (Printed Circuit Board, PCB), or may be disposed on a flexible printed circuit (Flexible Printed Circuit, FPC). This is not limited herein.

The liquid crystal polymer transmission line 10 is a transmission line 10 made of a liquid crystal polymer (Liquid Crystal Polymer, LCP) material. The modified polyimide transmission line 10 is a transmission line 10 made of a modified polyimide (Polyimide, PI) material.

It should be noted that the transmission line 10 in this application may be any one of the foregoing transmission lines 10, or may be another type of transmission line 10.

For ease of understanding a technical solution of this application, an example in which the transmission line 10 is a coaxial transmission line 10 is used for specific description in the following embodiments.

The coaxial transmission line 10 is a shielded and non-dispersive structure. A dominant mode of a waveguide in the coaxial transmission line 10 is a TEM mode, while transmission in a TE mode and a TM mode may also be supported. A cut-off frequency of the coaxial transmission line 10 is zero, and a corresponding cut-off wavelength tends to be infinite.

Figure 3:
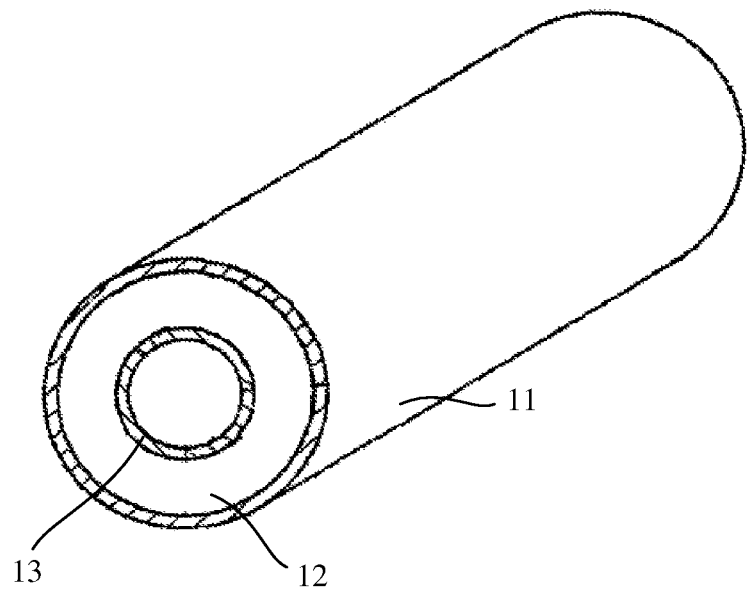
FIG. 3 is a schematic diagram of a three-dimensional structure of a coaxial transmission line according to an embodiment of this application.

As shown in FIG. 3, the coaxial transmission line 10 is a dual-conductor transmission line 10 including an inner conductor 13, an outer conductor 11, and a dielectric 12 therebetween, where the inner conductor 13 and the outer conductor 11 are coaxially disposed. Generally, the outer conductor 11 of the coaxial transmission line 10 is grounded. An electromagnetic field is limited between the inner conductor 13 and the outer conductor 11.

As shown in FIG. 4, in actual application, two ends of the outer conductor 11 of the coaxial transmission line 10 may snap-in to the ground for signal grounding, and the rest of the outer conductor 11 of the transmission line 10 is above the ground.

Figure 5:
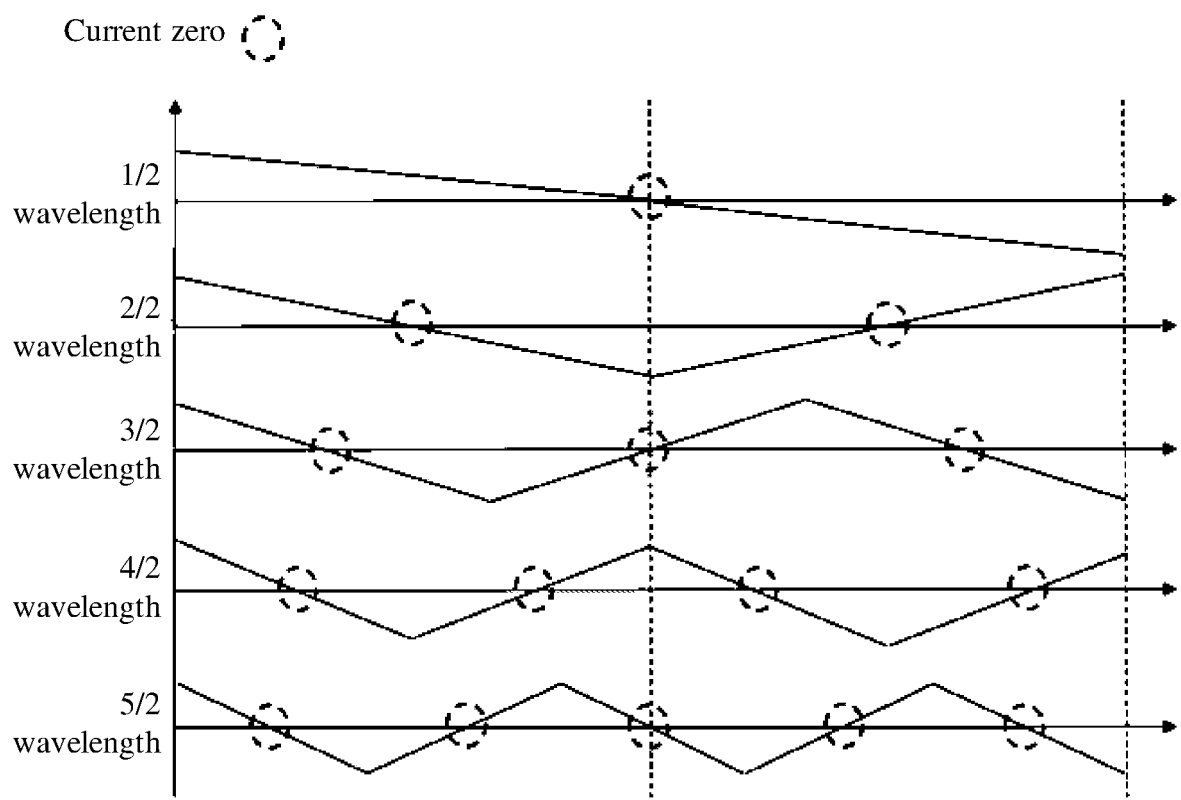
FIG. 5 is a diagram of current distribution of clutter signals in another transmission line according to an embodiment of this application.

With reference to FIG. 4 and FIG. 5, it is assumed that the length of the coaxial transmission line 10 is L, two ends of the outer conductor 11 are grounded, and a middle part of the outer conductor 11 is isolated from the ground. In such boundary conditions, the outer conductor 11 of the coaxial transmission line 10 and the ground form a loop mode. Because the length of the transmission line 10 is close to a radio frequency operating wavelength, if excitation is performed, a mode in which L is equal to n/2 times the wavelength may be generated based on the loop mode. Herein, n is an integer greater than or equal to 1. In an odd order mode (n is an odd number), a center point is a minimum current point—a capacitive region. In an even order mode (n is an even number), a center point is a maximum current point—an inductive region. Only some clutter modes are listed in the figures. Other higher order clutter modes are not listed herein.

Figure 6:
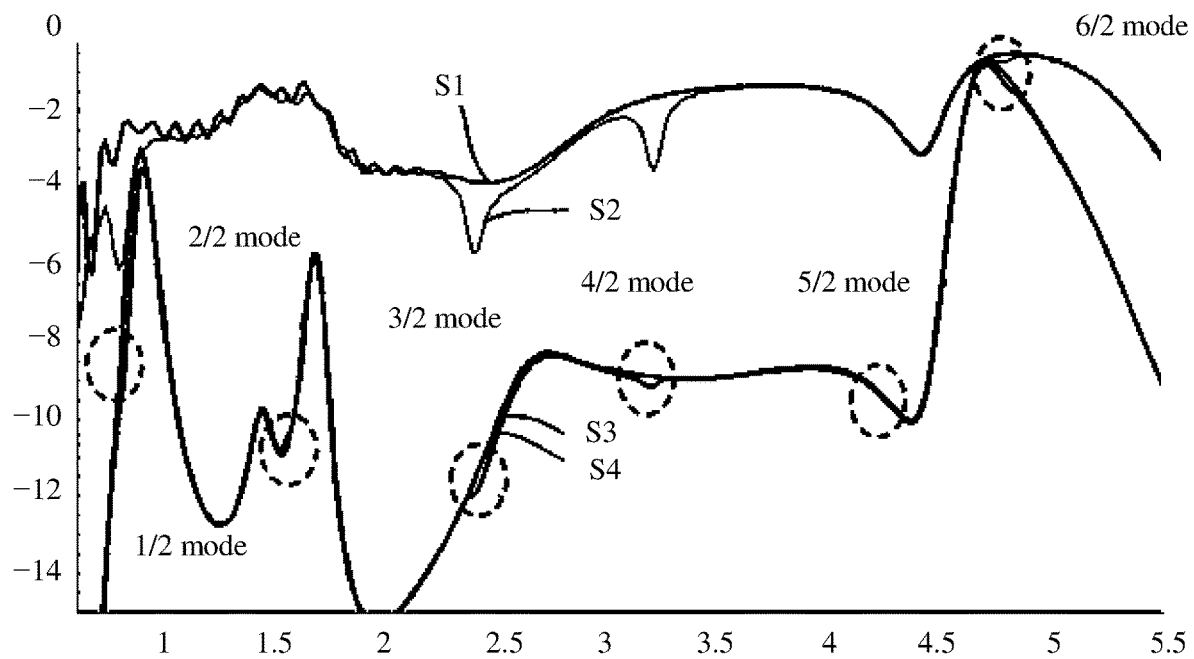
FIG. 6 is a diagram of data simulation according to an embodiment of this application.

As shown in FIG. 6, a horizontal coordinate represents a frequency, and a vertical coordinate represents antenna efficiency (indicated by dB). A line S1 represents radiation efficiency of an antenna when there is no coaxial transmission line 10. A line S2 represents the radiation efficiency of the antenna when there is the coaxial transmission line 10. A line S3 represents system efficiency of the antenna when there is the coaxial transmission line 10. A line S4 represents the system efficiency of the antenna when there is no coaxial transmission line 10. When two ends of the coaxial transmission line 10 are directly grounded, and there is a low-frequency antenna beside the coaxial transmission line 10, various modes of clutters in the coaxial transmission line 10 may be found by comparing efficiency when there is the coaxial transmission line 10 with efficiency when there is no coaxial transmission line 10. In a dominant mode and an n order frequency multiplication mode, a clutter in the dominant mode falls in a low frequency band and affects the antenna efficiency. In actual application, regardless of whether an operating frequency band of the antenna is at a low frequency or a medium-high frequency, as long as the antenna is located near the coaxial transmission line 10, these characteristic modes may fall into the operating frequency band of the antenna. Therefore, this problem needs to be resolved.

Figure 7:
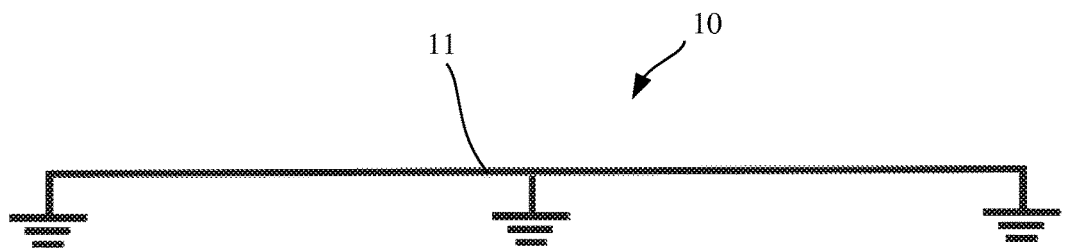
FIG. 7 is a schematic diagram of a connection structure of another transmission line assembly according to an embodiment of this application.
Figure 8:
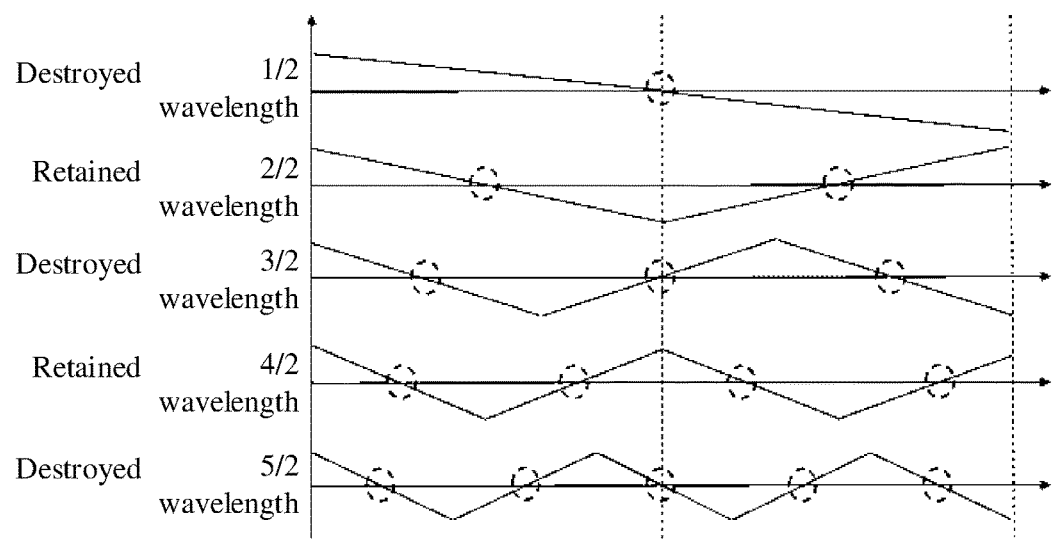
FIG. 8 is a schematic diagram of current distribution of clutter signals in another transmission line according to an embodiment of this application.
Figure 9:
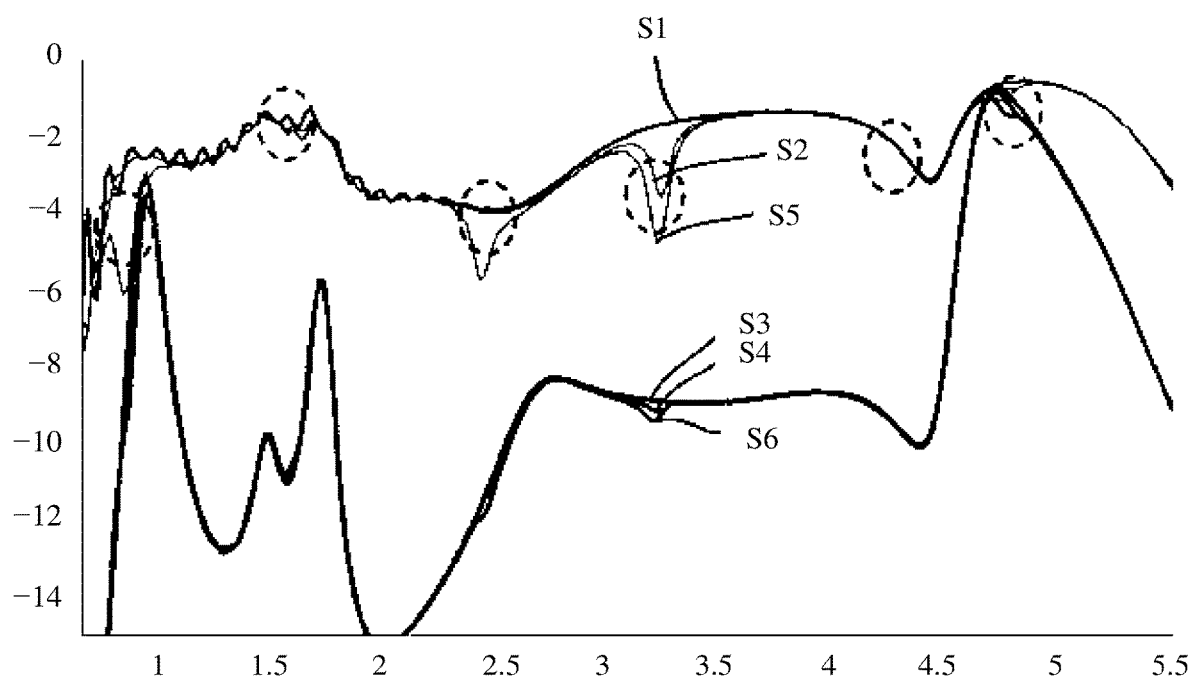
FIG. 9 is a diagram of data simulation according to an embodiment of this application.

As shown in FIG. 7 to FIG. 9, in some methods for removing clutters of the coaxial transmission line 10, two ends of the outer conductor 11 of the coaxial transmission line 10 may be grounded, and a middle part of the outer conductor 11 may also be grounded to implement grounding at the center. In terms of mode current distribution, grounding at the center destroys the capacitive region in the middle part, and therefore all odd order modes disappear; grounding at the center does not destroy the inductive region in the middle part, and therefore even order modes are retained.

In FIG. 9, a horizontal coordinate represents a frequency, and a vertical coordinate represents antenna efficiency (indicated by dB). A line S1 represents radiation efficiency of an antenna when there is no coaxial transmission line 10. A line S2 represents the radiation efficiency of the antenna when there is a coaxial transmission line 10 with two ends grounded. A line S5 represents radiation efficiency of the antenna when there is a coaxial transmission line 10 with two ends grounded and a center grounded. A line S3 represents system efficiency of the antenna when there is a coaxial transmission line 10 with two ends grounded. A line S4 represents the system efficiency of the antenna when there is no coaxial transmission line 10. A line S6 represents the system efficiency of the antenna when there is a coaxial transmission line 10 with two ends grounded and a center grounded. When two ends and the middle part of the coaxial transmission line 10 are directly grounded, and there is a low-frequency antenna beside the coaxial transmission line 10, various modes of clutters in the coaxial transmission line 10 may be found by comparing efficiency when there is the coaxial transmission line 10 with efficiency when there is no coaxial transmission line 10. In comparison between FIG. 6 and FIG. 9, it can be learned that after grounding at the center is implemented, odd order clutters disappear, while even order clutters still exist.

It may be understood that, in actual application, grounding may also be performed beyond a center location of the outer conductor 11. Details are not described herein again.

In the foregoing manner, when the coaxial transmission line 10 is grounded at the center, a grounding electrical connection is complex, and the manufacturing costs are high. In this case, it is likely to generate electric arc interference, or introduce other clutter problems. Therefore, there are many defects, and a great yield loss is caused.

Therefore, in this embodiment of this application, the transmission line 10 is grounded through a filter rather than grounded at the center, to resolve a clutter problem. In other words, when the clutter problem is resolved, effect made by grounding at the center is greater than or equal to effect made by grounding through the filter. Furthermore, the foregoing problems caused by grounding at the center can be avoided by grounding through the filter. Alternatively, it may be understood that, the clutter problem of the transmission line 10 can be effectively resolved by grounding through a filter. Meanwhile, it is more convenient for manufacturing at reduced costs when grounded through the filter. In addition, such grounding manner facilitates tuning of filtering parameters.

In specific application, the filter may perform tuning at a single end or two ends of the transmission line 10. The following specifically describes a case in which the filter performs tuning at the single end of the transmission line 10.

Figure 10:
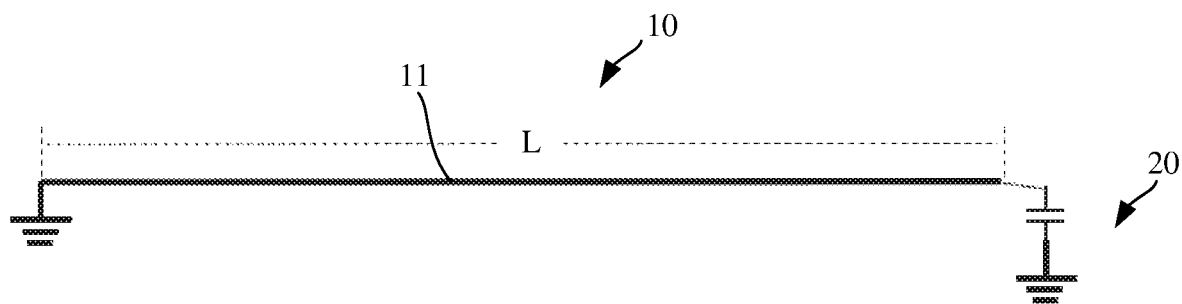
FIG. 10 is a schematic diagram of a connection structure of another transmission line assembly according to an embodiment of this application.

As shown in FIG. 10, a first end (a right end in the figure) of the outer conductor 11 of the transmission line 10 is grounded through a filter 20, and a second end (a left end in the figure) is directly grounded. The filter 20 may be a band-pass filter, or may be a band-stop filter circuit.

Figure 11:
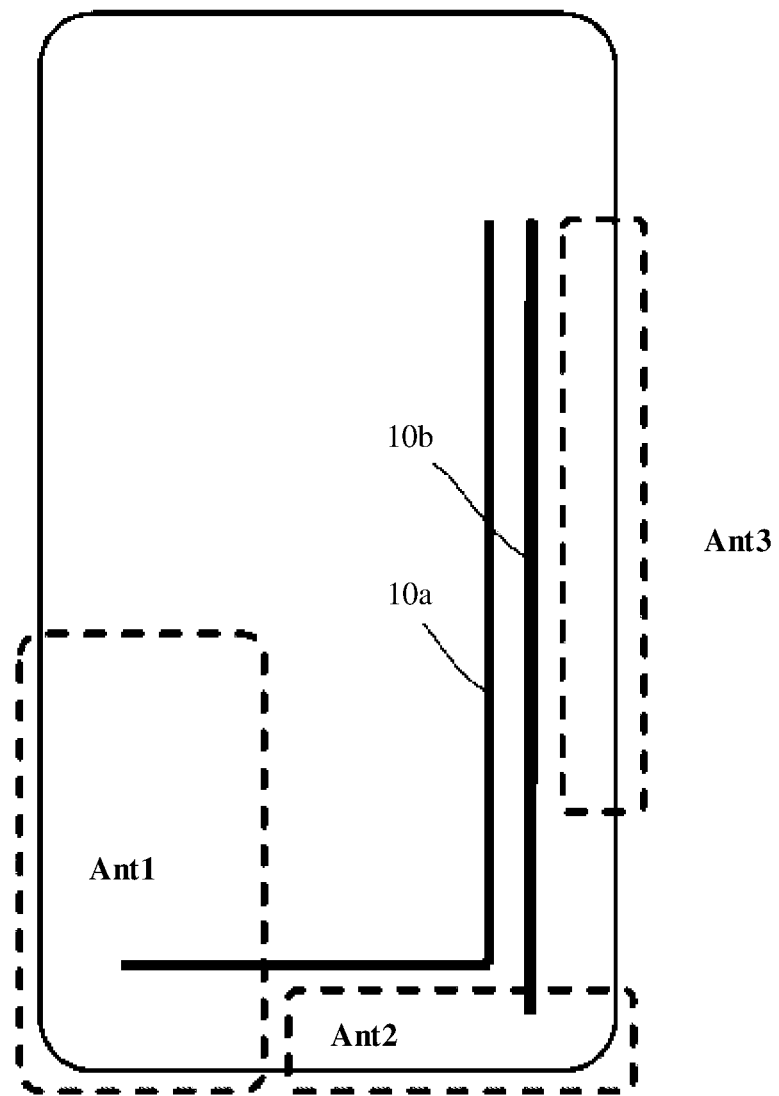
FIG. 11 is a schematic diagram of an application scenario of a transmission line assembly according to an embodiment of this application.

As shown in FIG. 11, a first antenna (ant1) needs to transmit a low-frequency signal through a first transmission line 10a, and a second antenna (ant2) needs to transmit a medium-high-frequency signal through a second transmission line 10b. A clutter of the second transmission line 10b affects a low-frequency signal of a third antenna (ant3).

Figure 12:
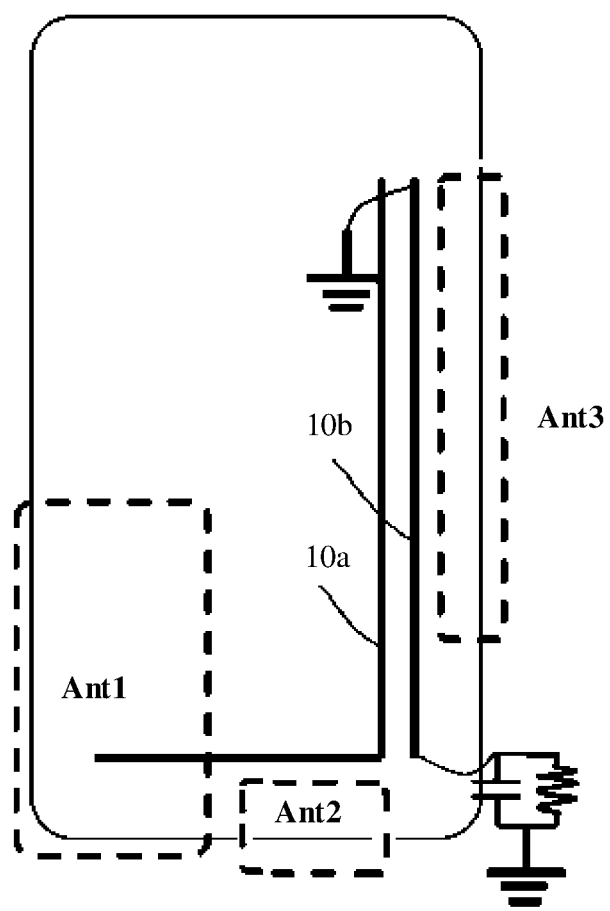
FIG. 12 is a schematic diagram of an application scenario of another transmission line assembly according to an embodiment of this application.

As shown in FIG. 12, filtering, for example, low-stop and high-pass, may be performed on one end of the second transmission line 10b in this case. In this way, an original loop resonance structure may be destroyed, a clutter in a dominant mode is removed from a band, and meanwhile, a grounding function for a medium-high-frequency signal is ensured.

Because one end of the outer conductor 11 of the second transmission line 10b is grounded through a filter, an original loop mode in which two ends are directly grounded is destroyed. Consequently, current distribution of the clutters is also destroyed. Due to introduction of a component having different performance for different frequencies, like the filter 20, a new boundary condition becomes complex. For example, only one end of the outer conductor 11 is grounded. In this case, the filter 20 is open-circuit to all frequency bands, and frequency multiplication of the clutters is shown in FIG. 13.

Figure 13:
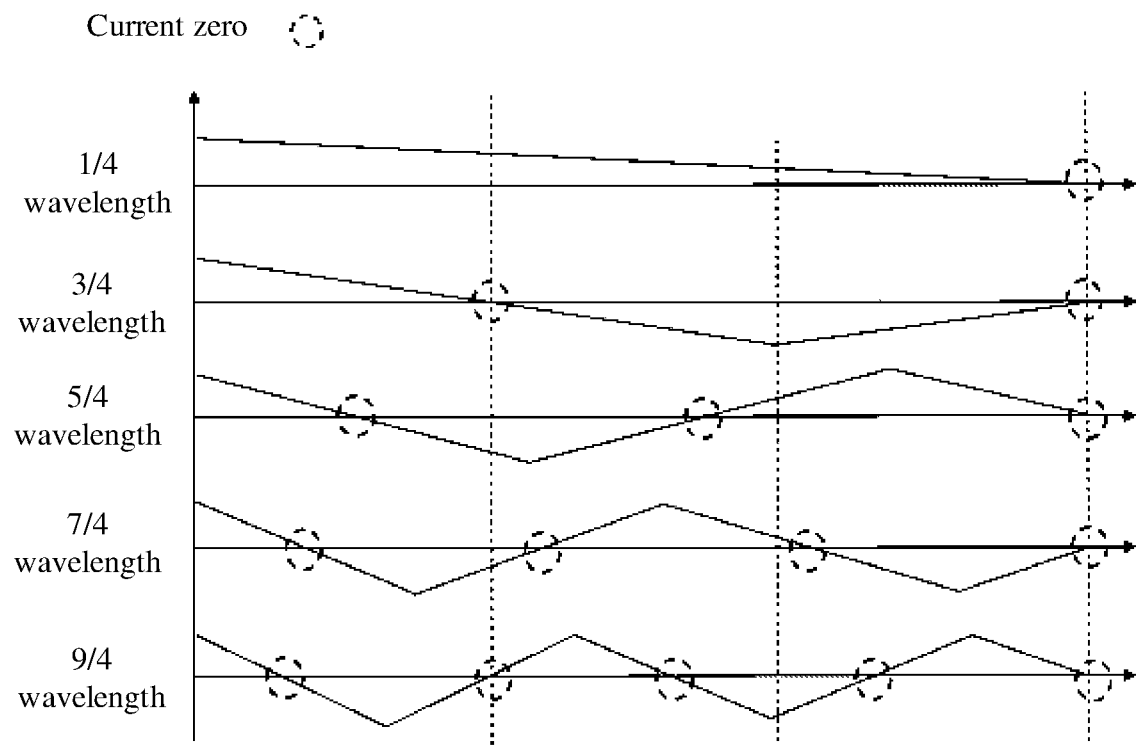
FIG. 13 is a schematic diagram of current distribution of clutter signals in another transmission line according to an embodiment of this application.

With reference to both FIG. 12 and FIG. 13, a clutter of the second transmission line 10b causes new clusters with odd order frequency multiplication on both the first antenna and the third antenna. Among these clutters, clutters with first order frequency multiplication and third order frequency multiplication are low-frequency. In this case, the low-frequency clutters are to be shifted from where they are. And clutters with fifth order frequency multiplication and seventh order frequency multiplication are medium-high-frequency. In this case, the medium-high-frequency clutters are as well to be shifted from where they are. Generally, a low-frequency passband is 700 M-960 M, and a medium-high-frequency passband is 1700 M-2700 M. Because the added filter is a band-pass filter, it may be understood that signals at a medium-high frequency (for example, at least 1700 M) are grounded at the filter, and signals at a low frequency are open-circuit. In an open-circuit scenario, clutters are shown as those in FIG. 13. In this case, it is assumed that the dominant mode is 350M, and third order frequency multiplication of the dominant mode is 1050 M. At a higher frequency, a fifth order clutter and a higher order clutter are re-expressed as clutters in a loop mode shown in FIG. 5 due to a function of the filter.

Figure 14:
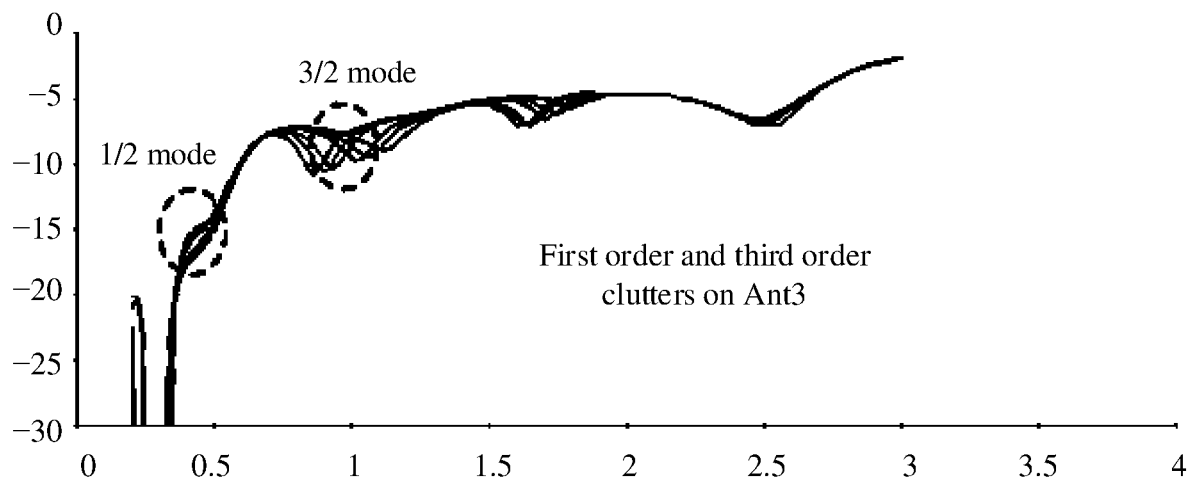
FIG. 14 is a diagram of data simulation of a first order clutter and a third order clutter of a third antenna according to an embodiment of this application.

As shown in FIG. 14, different clutter frequency shifts are observed for capacitors with different capacitance values in the filter. A smaller capacitance value of the capacitor indicates that the clutter is shifted to a higher frequency. A larger capacitance value of the capacitor indicates that the clutter is shifted to a lower frequency.

Figure 15:
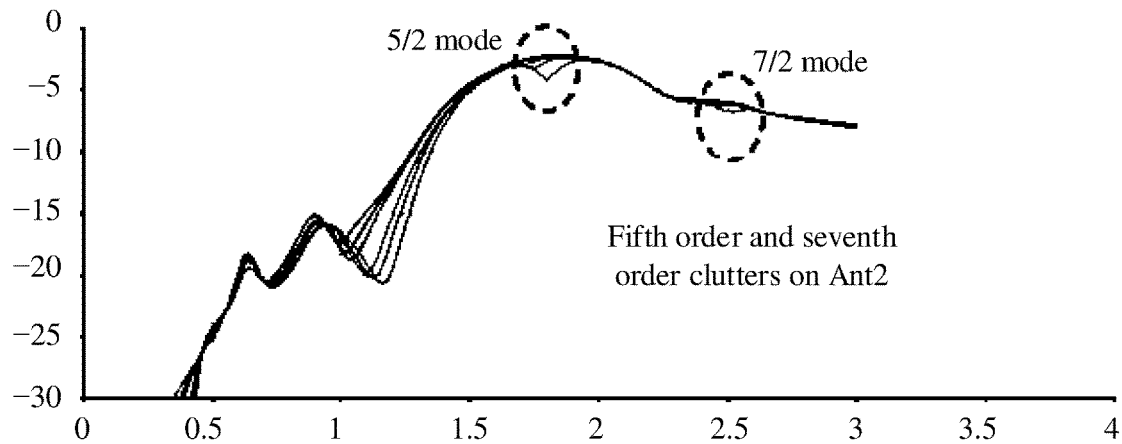
FIG. 15 is a diagram of data simulation of a fifth order clutter and a seventh order clutter of a second antenna according to an embodiment of this application.

As shown in FIG. 15, a prerequisite for removing a low-frequency clutter is that no new clutter is generated in a band of the second antenna. Herein, the fifth order frequency multiplication and the seventh order frequency multiplication fall into the band of the second antenna. In addition, a simulation result indicates that a clutter of the seventh order frequency multiplication has slight impact on the second antenna. Therefore, a proper capacitance value of a capacitor needs to be selected to enable the fifth order frequency multiplication to be shifted out of the band of the second antenna.

In this case, a clutter of the third order frequency multiplication falls into the low frequency. Therefore, an inductor may be added in the filter. If an inductor is added for grounding, the newly added inductor may raise the low frequency and expand a tuning range. Therefore, the dominant mode and the third order frequency multiplication may be adjusted to proper locations. The newly added inductor has negligible impact on clutters of the fifth order frequency multiplication and the seventh order frequency multiplication.

It can be understood that, in specific application, parameters of the filter may be properly selected and adjusted in a simulation manner, to implement effective tuning of the clutter.

In addition, in the foregoing implementation, the single end of the outer conductor 11 of the transmission line 10 is grounded through a band-stop filter. In other implementations, a type of the filter, a quantity of filters, and a connection relationship between the filter and the outer conductor 11 of the transmission line 10 may also be diversified.

Figure 16:
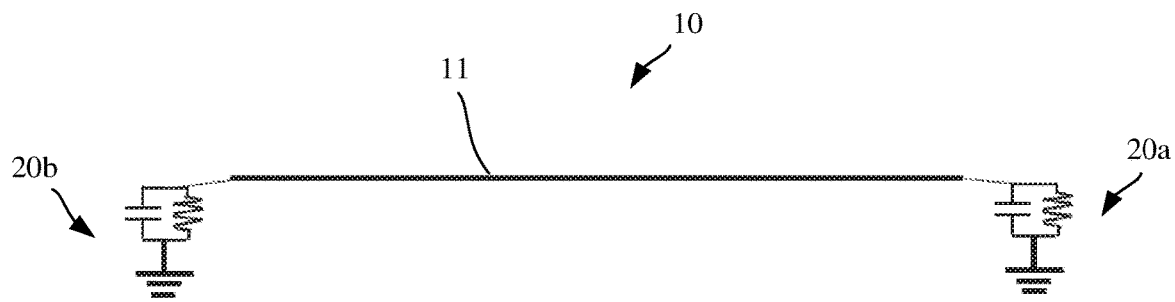
FIG. 16 is a schematic diagram of a connection structure of another transmission line assembly according to an embodiment of this application.

For example, as shown in FIG. 16, in another embodiment provided in this application, a first end (a right end in the figure) of the outer conductor 11 of the transmission line 10 may be grounded through a first band-stop filter 20a, and a second end (a left end in the figure) of the outer conductor 11 of the transmission line 10 may be grounded through a second band-stop filter 20b. In other words, the first band-stop filter includes a capacitor and an inductor that are connected in parallel. The second filter includes a capacitor and an inductor that are connected in parallel.

Figure 17:
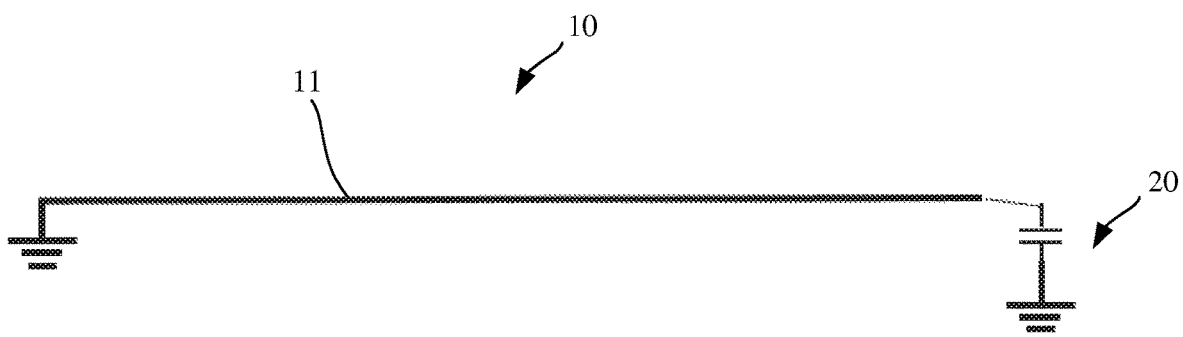
FIG. 17 is a schematic diagram of a connection structure of another transmission line assembly according to an embodiment of this application.
Figure 18:
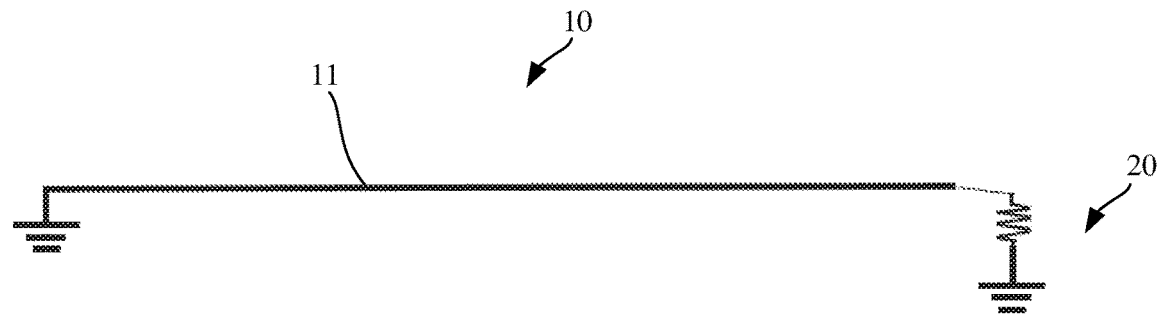
FIG. 18 is a schematic diagram of a connection structure of another transmission line assembly according to an embodiment of this application.

Alternatively, as shown in FIG. 17 and FIG. 18, a second end (a left end in the figure) of the outer conductor 11 of the transmission line 10 is directly grounded, and a first end (a right end in the figure) of the outer conductor 11 of the transmission line 10 may be grounded through a band-pass filter 20.

As shown in FIG. 17, during specific implementation, the band-pass filter 20 may be a high-pass filter. To be specific, the filter 20 includes a capacitor, and the first (right) end of the outer conductor 11 of the transmission line 10 is grounded through the capacitor.

As shown in FIG. 18, during specific implementation, the band-pass filter 20 may be a low-pass filter. In other words, the filter 20 includes an inductor, and the first (right) end of the outer conductor 11 of the transmission line 10 is grounded through the inductor.

Figure 19:
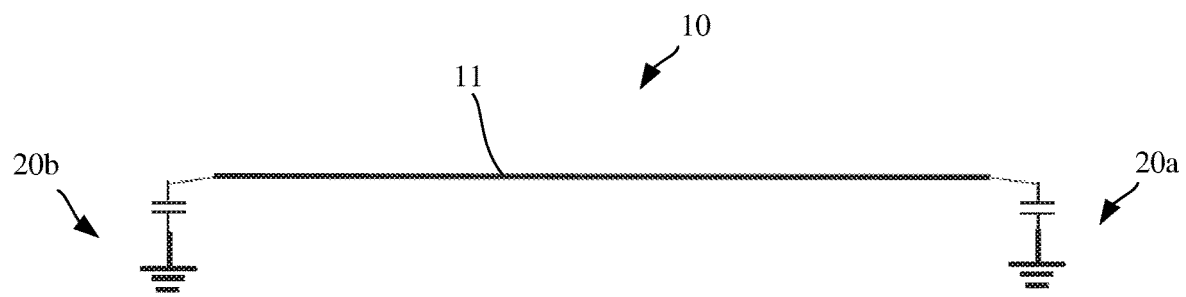
FIG. 19 is a schematic diagram of a connection structure of another transmission line assembly according to an embodiment of this application.
Figure 20:
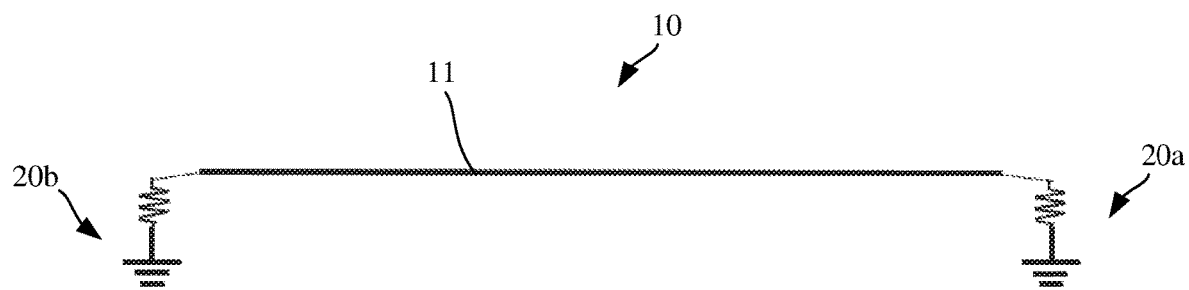
FIG. 20 is a schematic diagram of a connection structure of another transmission line assembly according to an embodiment of this application.

Alternatively, as shown in FIG. 19 and FIG. 20, a first end of the outer conductor 11 of the transmission line 10 is grounded through a first band-pass filter 20a, and a second end of the outer conductor 11 of the transmission line 10 may be grounded through a second band-pass filter 20b.

As shown in FIG. 19, during specific implementation, the first band-pass filter 20a may be a high-pass filter, and the second band-pass filter 20b may be a high-pass filter. To be specific, the first band-pass filter 20a includes a capacitor, and the first end of the outer conductor 11 of the transmission line 10 is grounded through the capacitor. The second band-pass filter 20b includes a capacitor, and the second end of the outer conductor 11 of the transmission line 10 is grounded through the capacitor.

As shown in FIG. 20, in a specific implementation, the first band-pass filter 20a may be a low-pass filter, and the second band-pass filter 20b may be a low-pass filter. To be specific, the first band-pass filter 20a includes an inductor, and the first end of the outer conductor 11 of the transmission line 10 is grounded through the inductor. The second band-pass filter 20b filter includes an inductor, and the second end of the outer conductor 11 of the transmission line 10 is grounded through the inductor.

In addition, an embodiment of this application further provides an antenna assembly, including an antenna and a cable assembly.

In the antenna assembly provided in this application, a transmission line 10 is grounded through a filter, thereby tuning a clutter outside an operating frequency band of the transmission line 10 and reducing or avoiding an impact of the clutter on efficiency of an antenna near the transmission line 10.

During specific implementation, a quantity of disposed antennas and a disposing location may be adaptively selected and adjusted according to different requirements. This is not limited in this application.

For example, the antenna assembly may include a first antenna, a second antenna, a first transmission line 10, and a second transmission line 10. The first transmission line 10 is configured to transmit a radio frequency signal to the first antenna, and the second transmission line 10 is configured to transmit a radio frequency signal to the second antenna.

During specific implementation, an operating frequency band of the first antenna may be different from an operating frequency band of the second antenna. For example, the first antenna may be an antenna configured to generate a low-frequency signal, and the second antenna may be an antenna configured to generate a medium-high-frequency signal.

It may be understood that, in another implementation, the antenna assembly may further include more antennas and transmission lines 10. This is not specifically limited in this application.

In addition, an embodiment of this application further provides a mobile terminal, including the foregoing antenna assembly. In actual application, the mobile terminal may be a mobile phone, a tablet computer, or the like.

In the mobile terminal provided in this application, the foregoing antenna assembly is disposed, to ensure radiation efficiency and signal transmission quality of an antenna, thereby improving quality consistency and use effect of the mobile terminal device.

The foregoing descriptions are merely specific implementations of this application, but are not intended to limit the protection scope of this application. Any variation or replacement readily figured out by a person skilled in the art within the technical scope disclosed in this application shall fall within a protection scope of this application. Therefore, the protection scope of this application shall be subject to the protection scope of the claims.

What is claimed is:

1. A transmission line assembly, comprising:
   a transmission line, comprising:
      a first end and a second end;
      an inner conductor and an outer conductor, the transmission line being configured to transmit a radio frequency signal; and
   a first filter connected to a first end of the outer conductor, the first end of the outer conductor being grounded through the first filter, the first filter being configured to tune clutter of the transmission line.

2. The transmission line assembly according to claim 1, wherein the transmission line is any one of a coaxial transmission line, a microstrip transmission line, a liquid crystal polymer transmission line, and a modified polyimide transmission line.

3. The transmission line assembly according to claim 1, wherein the first filter is a band-pass filter or a band-stop filter.

4. The transmission line assembly according to claim 1, wherein the first filter comprises at least one of a capacitor or an inductor.

5. The transmission line assembly according to claim 1, further comprising a second filter, the second filter being connected to the second end of the outer conductor, the second end of the outer conductor being grounded through the second filter.

6. The transmission line assembly according to claim 5, wherein the second filter is a band-pass filter or a band-stop filter.

7. The transmission line assembly according to claim 5, wherein the second filter comprises at least one of a capacitor or an inductor.

8. The transmission line assembly according to claim 5, wherein the first filter and the second filter are of a same type.

9. A mobile terminal, comprising:
a first antenna; and
a transmission line assembly, comprising:
a transmission line comprising:
a first end and a second end;
an inner conductor and an outer conductor, the transmission line being configured to carry a radio frequency signal to the first antenna; and
a first filter connected to a first end of the outer conductor, the first end of the outer conductor being grounded through the first filter, the first filter being configured to tune clutter of the transmission line.

10. The mobile terminal according to claim 9, wherein the transmission line is any one of a coaxial transmission line, a microstrip transmission line, a liquid crystal polymer transmission line, and a modified polyimide transmission line.

11. The mobile terminal according to claim 9, wherein the first filter is a band-pass filter or a band-stop filter.

12. The mobile terminal according to claim 9, wherein the first filter comprises at least one of a capacitor or an inductor.

13. The mobile terminal according to claim 9, further comprising a second filter, the second filter being connected to the second end of the outer conductor, the second end of the outer conductor being grounded through the second filter.

14. The mobile terminal according to claim 13, wherein the second filter is a band-pass filter or a band-stop filter.

15. The mobile terminal according to claim 13, wherein the second filter comprises at least one of a capacitor or an inductor.

16. The mobile terminal according to claim 13, wherein the first filter and the second filter are of a same type.

17. The mobile terminal according to claim 9, further comprising,
a second antenna, the first antenna and the second antenna having different operating frequency bands.

18. The mobile terminal according to claim 9, wherein the mobile terminal is a mobile phone or a tablet computer.

19. A mobile terminal, comprising:
a first antenna;
a second antenna spaced apart from the first antenna; and
a transmission line assembly, comprising:
a first transmission line, comprising:
a first end and a second end;
the first end of the transmission line is connected to the first antenna to transmit a signal having a first frequency;
a second transmission line, comprising:
a first end and a second end;
an inner conductor and outer conductor, wherein:
one of the first and second ends of the second transmission line is grounded through a filter at one end and grounded at the other of the first and second ends, the filter being configured to tune clutter outside of an operating frequency band of the first frequency of the first antenna.

20. The mobile terminal of claim 19, wherein the filter is one of a band-pass filter or a band-stop filter.

* * * * *